United States Patent [19]

Hauk et al.

[11] 4,222,174

[45] Sep. 16, 1980

[54] METHOD AND APPARATUS FOR GAGING AND JOINING PIPE

[76] Inventors: Ernest D. Hauk, 1315 E. 23rd St., Signal Hill, Calif. 90806; Thomas D. Hauk, 5313 Mezzanine Way, Long Beach, Calif. 90808; Kenneth J. Carstensen, 1522 N. Muskingum, Odessa, Tex. 79761

[21] Appl. No.: 940,626

[22] Filed: Sep. 8, 1978

Related U.S. Application Data

[60] Division of Ser. No. 792,568, May 2, 1977, which is a continuation-in-part of Ser. No. 728,148, Sep. 30, 1976.

[51] Int. Cl.³ .............................................. G01B 3/14
[52] U.S. Cl. .............................. 33/199 R; 33/178 E; 33/180 R; 33/21 R
[58] Field of Search ............. 33/199 R, 180 R, 181 R, 33/189, 18 R, 21 R, 21 B, 22, 27 R, 27 B, 27 D, 27 E–27 G, 169 R, 178 R, 178 E

[56] References Cited

U.S. PATENT DOCUMENTS

| | | | |
|---|---|---|---|
| 1,718,793 | 6/1929 | Macke | 118/34 |
| 2,015,086 | 9/1935 | Paynter et al. | 101/28 |
| 2,167,589 | 7/1939 | Schutz | 91/70 |
| 2,200,885 | 5/1940 | Johnson | 33/199 R |
| 2,233,626 | 3/1941 | McClure | 33/199 R |
| 2,630,633 | 3/1953 | Webb | 33/180 R |
| 2,746,497 | 5/1956 | Thompson | 144/205 |
| 3,047,960 | 8/1962 | Mittenbergs et al. | 33/199 R |
| 3,296,705 | 1/1967 | Johnson | 33/174 Q |
| 3,324,562 | 6/1967 | Kelso | 33/199 R |
| 3,395,457 | 8/1968 | Callahan, Jr. | 33/174 |

Primary Examiner—Willis Little
Attorney, Agent, or Firm—Gausewitz, Carr, Rothenberg & Edwards

[57] ABSTRACT

The present method and apparatus are believed to be the first to achieve, at least in a practical manner susceptible of widespread use on large numbers of joints, both proper engagement and proper makeup torque between tapered threaded members such as sections of pipe in an oil well or pipeline. In accordance with one embodiment, presently preferred, gage means are employed to determine the actual hand tight plane of each tapered threaded member, and a mark is made on each such member in predetermined relationship to the hand tight plane. Such marks are then employed for field inspection of joints which have been made up to a predetermined, measured, desired makeup torque. In accordance with another embodiment, the members (for example, casing and tubing sections and collars) are made up until the marks on the collar and the pipe are at a predetermined axial distance from each other at a predetermined makeup torque or predetermined desired range of makeup torques. In accordance with another embodiment, not preferred, only one of the two members is gaged and marked. Gaging and marking may be effected rapidly, even under adverse field conditions. The apparatus and method employ automatic centering means and associated elements which make it possible to power-screw a gage onto a pipe section rapidly, with no substantial start-up problems. Furthermore, the apparatus and method employ a precision pipe-marking means, and preferably employ a gage card having a predetermined relatonship to the marking means.

52 Claims, 12 Drawing Figures

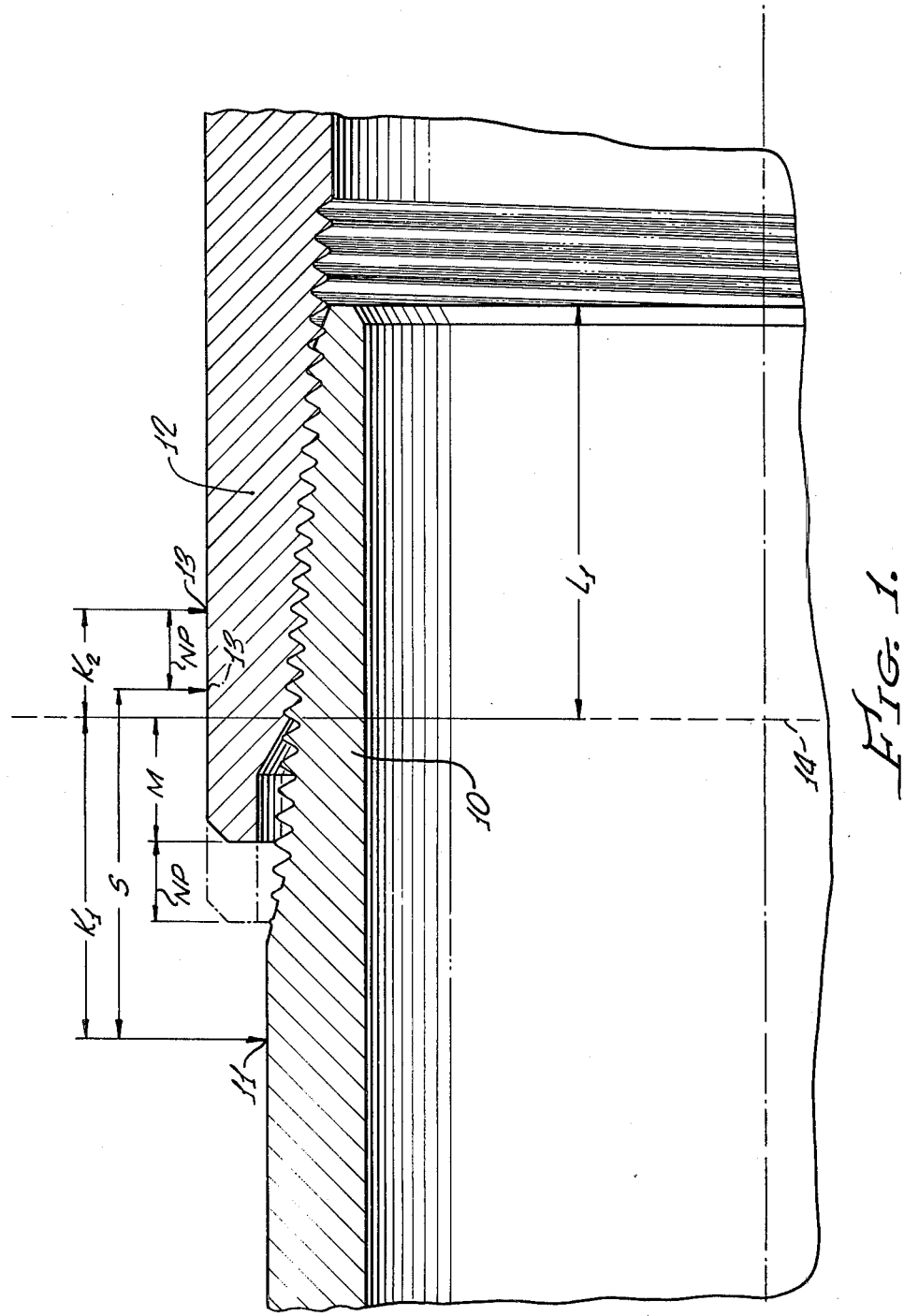

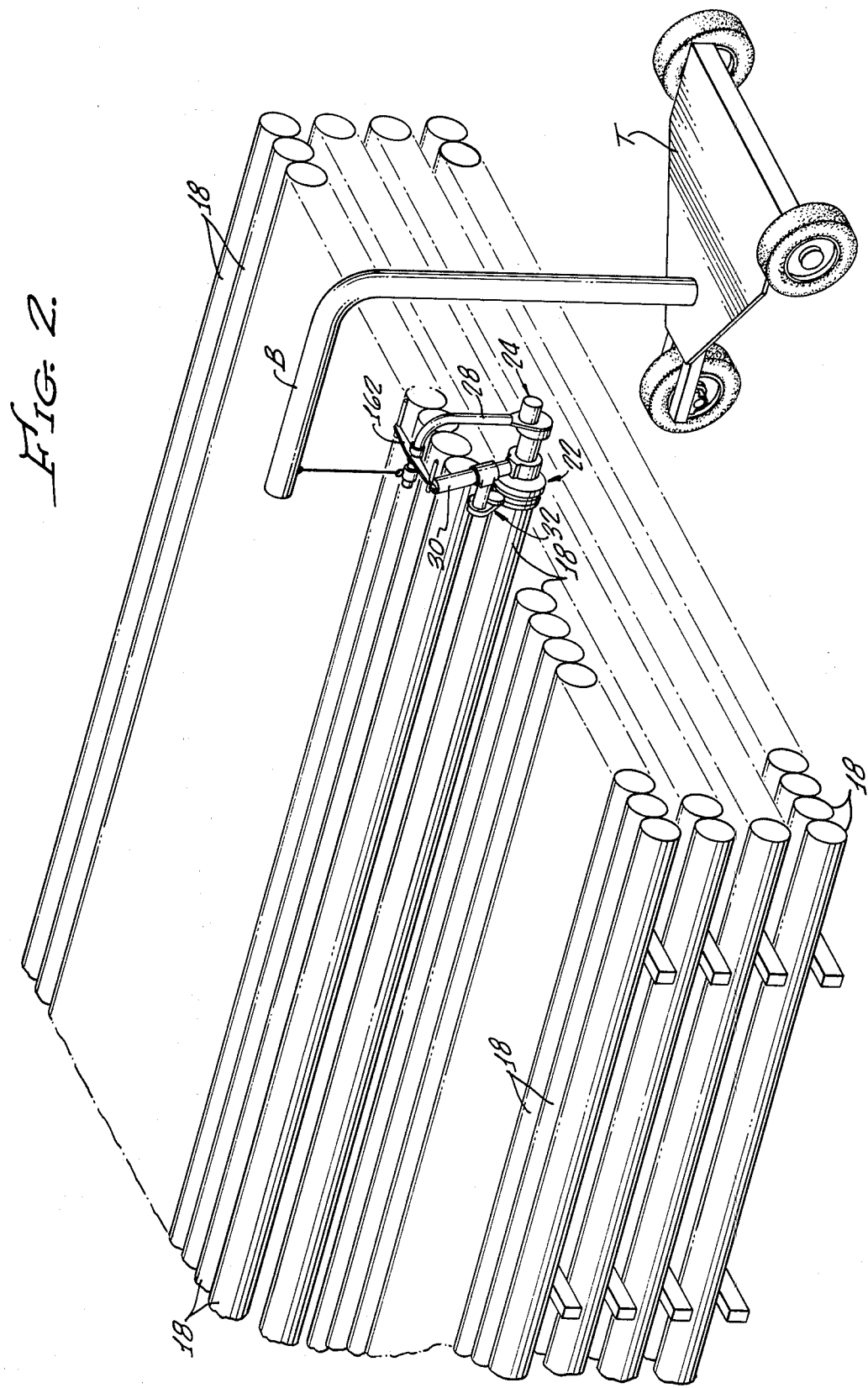

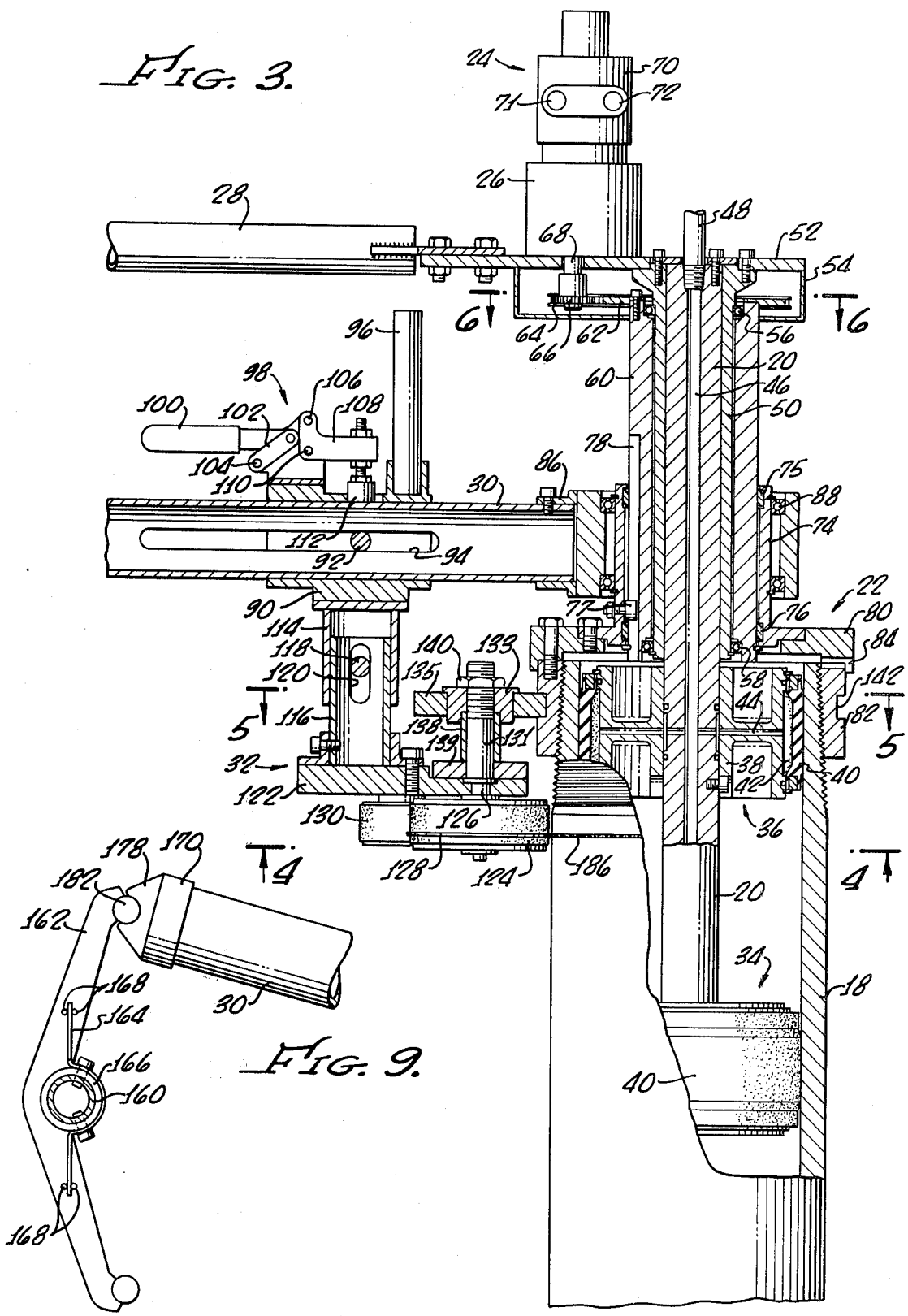

METHOD AND APPARATUS FOR GAGING AND JOINING PIPE

CROSS REFERENCE TO RELATED APPLICATION

This application is a division of application Ser. No. 792,568, filed May 2, 1977, which application is in turn a continuation-in-part of U.S. patent application Ser. No. 728,148, filed Sept. 30, 1976, for Method and Apparatus for Gaging and Joining Pipe.

BACKGROUND OF THE INVENTION

1. Field of the Invention

This invention relates to the field of tapered threaded pipe joints. It particulary concerns a method and apparatus for use in the gaging and joining of tapered, threaded pins and boxes.

2. Description of Prior Art

Pipe sections used in oil fields (for example, long sections of well casing or tubing) usually have tapered, exteriorly-threaded male ends, called "pins." Such ends are threaded into collars (which are short female pipe sections the threaded portions of which are often called "boxes"), there being an interiorly-threaded tapered box region at each end of each collar. The tapered, threaded joints are very difficult to make up (form) properly.

For example, because the male and female threaded regions are tapered (frustoconical), there can only be a certain amount of penetration of the pin into the box before permanent deformation of the threads occurs. Such permanent deformation is not desired for reasons including the fact that the pins and boxes are then not reusable. In extreme cases, the box may split. Conversely, however, there must be a sufficient penetration to achieve good sealing against gas or oil leakage, to achieve adequate resistance to axial tensile stresses, etc.

There are two major factors that determine whether or not a joint between two tapered pipe regions (namely, between a pin and a box) is correctly made. The first factor is the degree of penetration, or amount of engagement, as stated above. The second factor is the makeup torque, namely the torque which exists at the very last increment of the makeup procedure. Makeup torque values have been established by the American Petroleum Institute ("API") for each size, weight, and grade of casing and tubing.

Although it has long been known that there must be both (a) proper engagement (namely, proper degree of penetration) and (b) proper torque, in order to have a correctly made up tapered joint, workers in oil fields do not now achieve these factors conjointly with any degree of regularity. Instead of knowing when there is proper engagment (degree of penetration) in each joint, at the proper torque, it is conventional practice to rely upon approximations, estimates and surmises. It is not conventional to gage the pin and/or box at each and every joint and then use the results of the gaging to achieve good connections. The present invention makes it practical to gage the pin and box for each joint, even in the field, and employs the results of the extensive gaging to assure that there is proper engagement (penetration) at each joint.

The gaging effected by the present apparatus and method produces, as one of its major benefits, the correct location of the actual "hand tight plane." The hand tight planes of tapered pipe and collar members are planes normal to the axes of each, which planes are coplanar when the two members are in so-called hand tight engagement. When in such hand tight engagement, the threads have been interengaged to a point where they are in intimate contact but without deformation. This normally will occur at a torque of from ten to eighty foot pounds for seven inch long thread (8-round) casing, for example.

From another point of view, the hand tight planes of the collar and pipe are coplanar when the two have been threaded together to such an extent that any further threading of the male member into the female member will commence to deform the threads. (This hand tight engagement of tapered threaded elements is analogous to an interengagement of male and female smooth-surfaced frustoconical members, which are axially interengaged to a point of intimate contact in which no significant deformation takes place. With such smooth frustoconical members, further interengagement from this analogous hand tight engagement would require deformation of the two parts, namely a decrease in diameter of the male and/or an increase in diameter of the female.)

The hand tight plane is defined by the American Petroleum Institute in the *API Specification for Threading, Gaging, and Thread Inspection of Casing, Tubing, and Line Pipe Threads*, API Standard 5B, Ninth Edition, March, 1974, which is hereby incorporated by reference as though fully set forth herein. The plane of hand tight engagement of the collar is at a distance M from the end of the coupling, and that the plane of hand tight engagement of the pipe is at a distance $L_1$ from the end of the pipe. These two planes are coincident in the condition of hand tight makeup of the two elements. (Reference is also made to FIG. 1 of the present patent application.)

Values of M and $L_1$ are given in this API Specification for different sizes and thread types of casing, line pipe and tubing. It is emphasized, however, that the API data concerning M and $L_1$ are not used by applicants to locate the hand tight plane. The reason M and $L_1$ data are not used by applicants for hand tight plane locations is that the API permits substantial tolerances which applicants desire to eliminate.

Unless the actual (not theoretical) hand tight plane or planes are known, you can't be sure whether or not there is proper engagement (degree of penetration of the pin into the box) in the completed joint. Furthermore, as stated above, unless there is proper engagement at the proper torque you can't be assured of a correctly made up joint.

It might be thought that since the pipes (and collars) are mass produced in pipe mills, the hand tight planes thereof are the same and could be known by (for example) a mark made a certain distance from the end. This is not so, since there are manufacturing tolerances which make the pipes (and collars) far from perfectly uniform. The only practical way to be sure of locating the hand tight planes correctly is to use a standard thread gage on each pipe and collar element.

It is an important advantage of the present apparatus and method that they work properly on tubular sections (tubing and casing sections and collars) having "standard" API threads, such as those referred to in the above-cited API Specification. In most of these standard API threads, the cross-sectional shape of each thread is substantially triangular. (The word "substantially" is used because, for casing and tubing threads, the apex is often rounded—the threads being therefore conventionally termed "round.") Other API threads include buttress, etc.

The present apparatus and method not only locate, and make extensive use of, the true hand tight planes, but they also achieve other important benefits of extensive field gaging. Thus, for example, the gaging informs the user whether or not there has been any thread damage. Such damage may result from various factors existing after the pipes and collars leave the factory.

Very importantly the present gage apparatus can be employed while the pipe sections are horizontally positioned in racks near the wellhead. It is thus known, before the actual wellhead is reached, whether or not each pin and box meets API requirements. The gage apparatus can also be employed at pipe manufacturing plants, threading plants and along pipelines. It is preferred that gaging occur in the field, since changes subsequent to leaving the factory, etc., will then be detected.

Pipe gages (ring gages and plug gages) for tapered pins and boxes have, of course, long been used. They are often heavy, and thus difficult to "start" (commence threading) without false starts and/or cross-threading. There is thus a major need for plug gages and ring gages which—even when heavy and cumbersome—can be used quickly and easily. The present invention not only provides such gage apparatus but further achieves the great added benefits of simple, practical and economical pipe-marking means adapted to mark the pipes and collars in accordance with the actual locations of the hand tight planes. The marks and suitable torque gages are then used at the wellhead, in a very simple manner requiring almost no wellhead time, to conjointly achieve both (1) proper penetration (engagement) and (2) the proper, measured makeup torque.

SUMMARY OF THE INVENTION

The pipe and collar members are each gaged, and a mark is made on each at a predetermined axial position relative to the hand tight plane of each gage when the latter is in hand tight engagement with the member. The axial distance between the marks is then used, at the wellhead, to inform the operator whether or not each joint, which has been made up to a desired torque value which is measured as by a torque gage, is good. More specifically, a mark-distance measuring (and tolerance) means in the form of a gage card is used at the wellhead as soon as torquing ceases.

In accordance with another embodiment, the thus-marked pipe and collar members are made up until the marks have predetermined axial positions relative to each other, and the measured makeup torque is noted to see whether or not it is in a desired range.

The apparatus and method for gaging and marking (preferably at racks spaced from the wellhead) employ centering means to line up the plug or ring gage with the pipe axis, so that the plug or ring may be power-threaded with no false starts. Such centering means incorporate fluid-operated "packers." As soon as the gage has been driven to the hand tight position, the apparatus and method effect precision marking of the pipe and collar in a very short time. The marks extend circumferentially, for at least half the pipe circumference, being thus readily viewed without walking around the string.

Certain aspects of the apparatus and method may be used to effect gaging only, or to effect gaging or marking of only the pipes or only the collars. For example, a mark may be made on the pipe by the gaging and marking means. This mark is then correlated to the position of the end of the collar after the predetermined, measured makeup torque is reached. In accordance with the other embodiment, torquing is continued until the mark is in predetermined relationship to the collar end, and then the measured make-up torque is noted.

BRIEF DESCRIPTION OF THE DRAWINGS

FIG. 1 illustrates, in section, one side of a tapered threaded joint;

FIG. 2 is a perspective view showing the overall gaging and marking apparatus adjacent a rack of horizontal pipe sections;

FIG. 3 is a longitudinal section of the apparatus of FIG. 2a, taken on line 3—3;

FIG. 9 shows the underside of the rocket arm;

DETAILED DESCRIPTION

Figure 2A:
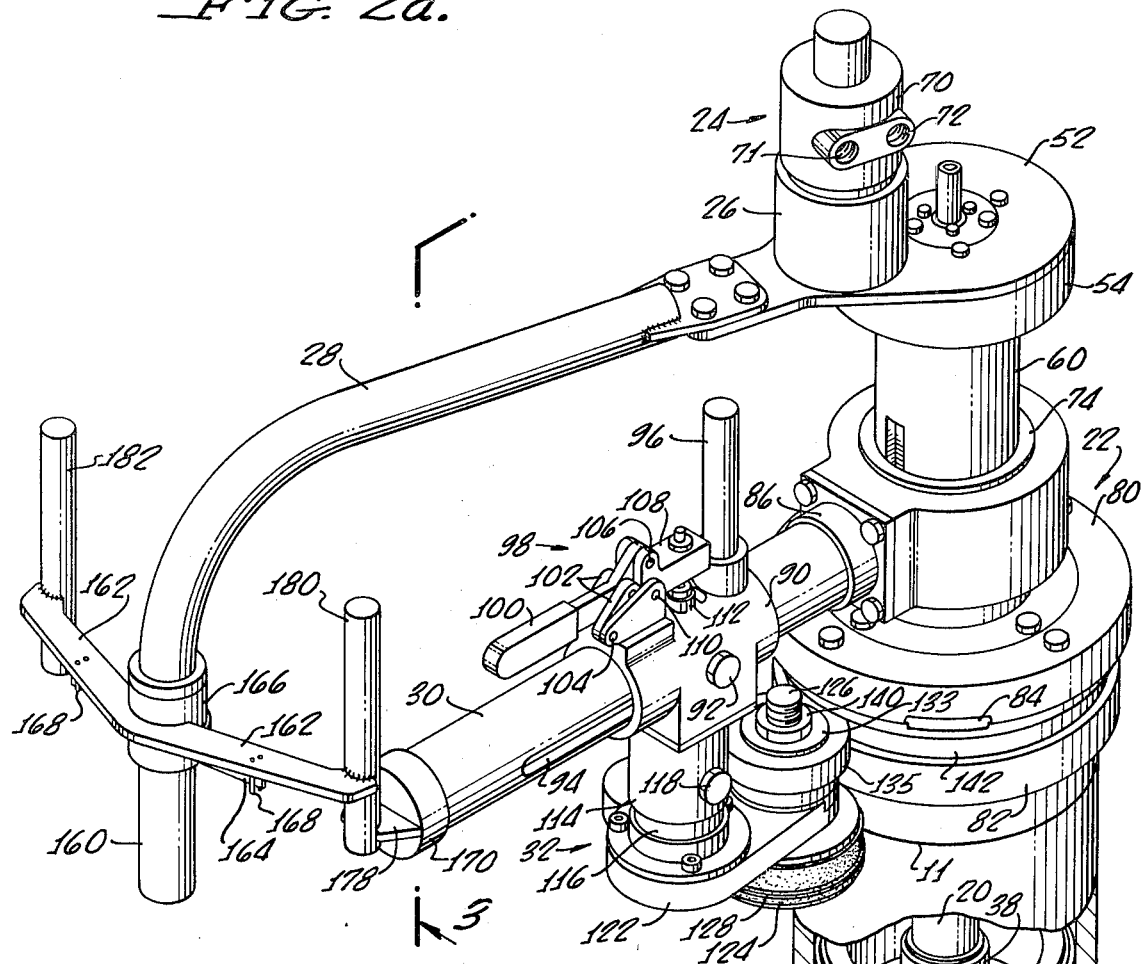
FIG. 2a is a perspective view of the particular apparatus for gaging and marking a pipe, namely a tubing or casing section.
Figure 8:
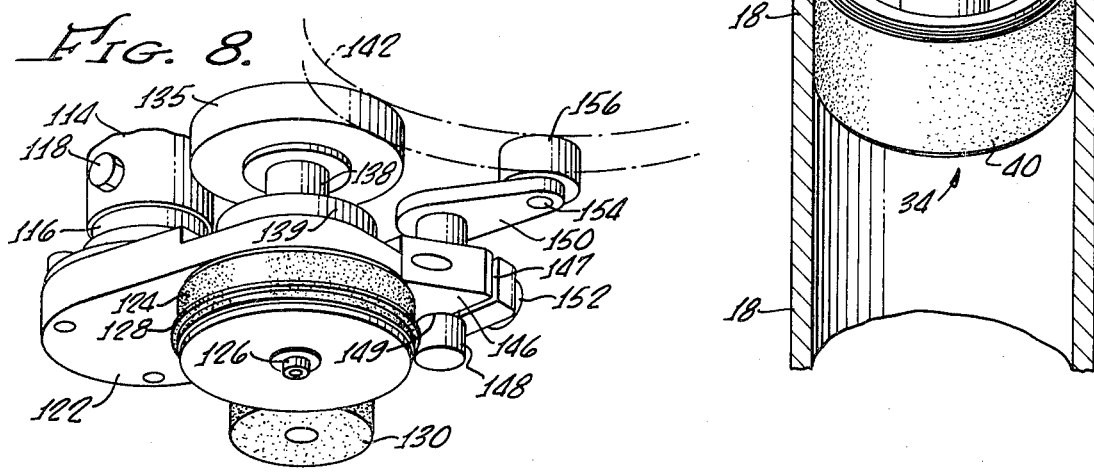
FIG. 8 is a perspective view of parts of the marker head assembly.
Figure 6:
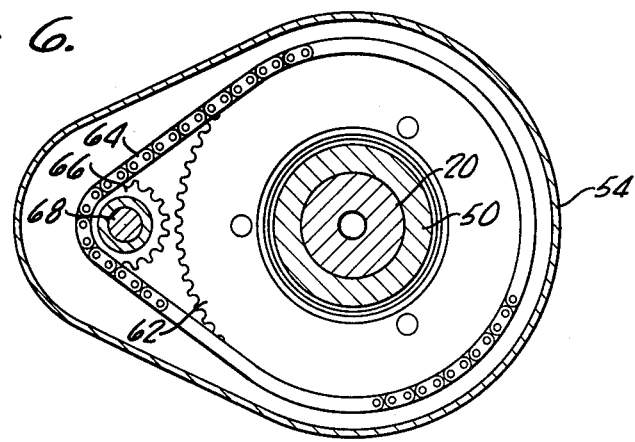
FIGS. 4, 5 and 6 are transverse sections taken on lines 4—4, 5—5 and 6—6 of FIG. 3.
Figure 5:
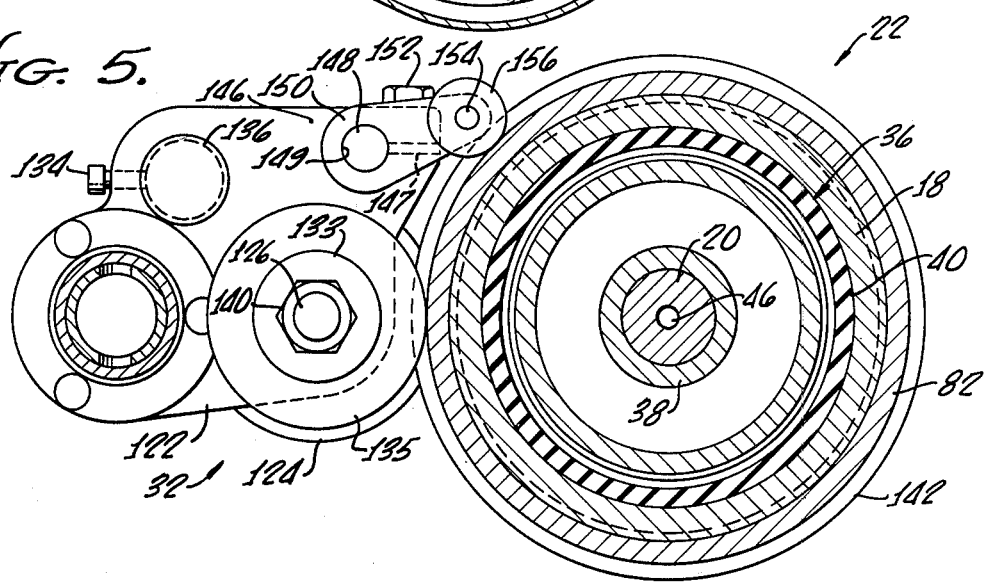
Figure 4:
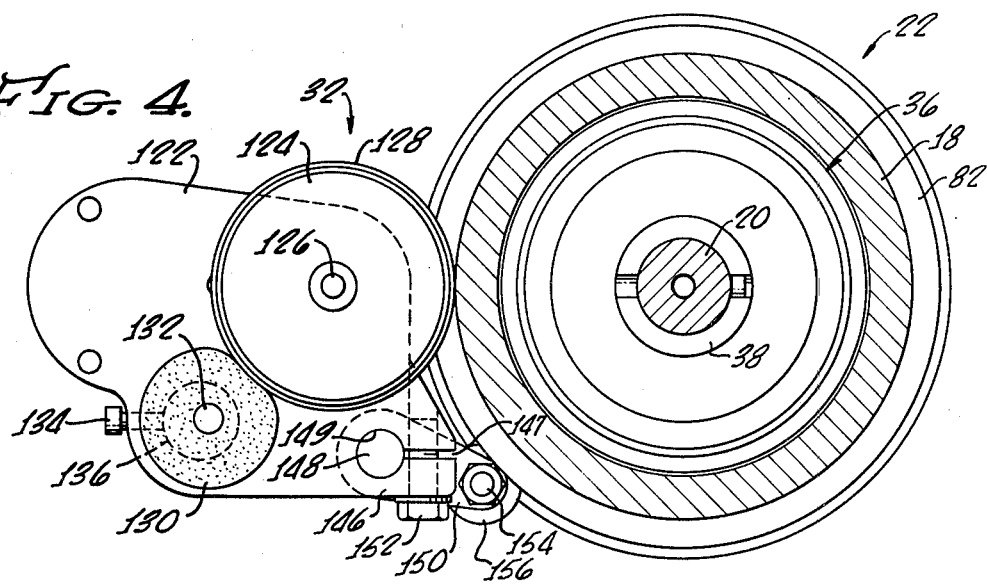

Preliminary Discussion, and General Description of the Method

When the collar and pipe are threadedly engaged past the hand tight plane, and the number of turns increases, stress on the threads increased because of the taper. As stress increases, greater resistance is exerted to further turning. Therefore, torque required for further turning increases as the interengagement proceeds. By the time that the desired torque has been attained, the two parts have relatively rotated a number of turns and thus, for a theoretically good pipe and collar of each type, size, etc., there exists a predetermined correct number of turns past the hand tight plane at the desired torque.

Such predetermined correct number of turns past the hand tight plane can be determined empirically for each type, size, etc., of pipe. It is emphasized, however, that if the actual (not theoretical of "nominal") hand tight plane is not correctly known, the "predetermined correct number of turns past the hand tight plane" cannot be regularly achieved. This is true even though there is a certain tolerance in the predetermined correct number of turns (that is to say, there is a predetermined maximum number of turns and a predetermined minimum number thereof, all referenced to the actual hand tight plane).

Should the pipe and/or collar components depart from the ideal, having misshaped or damaged threads, wrong taper, dirt on the threads, etc., the very same desired torque will not provide the same number of turns past the hand tight plane. Thus, if the number of turns past the hand tight plane is not within the predetermined tolerance limits, at the desired torque, it is known that the joint is defective.

The present invention not only provides a method and means for accurately and quickly locating the actual hand tight plane, and for gaging the pipe, but it also provides a practical method and means whereby the operator can easily and quickly determine whether or not there has been more or less than the correct number (or range) of turns past the hand tight plane at the desired torque. (When the operator thus determines that there has been either (a) more than or (b) less than the predetermined number or range of turns, he can use his own judgment regarding whether or not to discard the joint. In any event, he keeps a log or record of the joint for future reference.)

Each of the pipe and collar elements is marked at a known axial distance from its actual hand tight plane and, after makeup (at the wellhead) of the joint to the desired torque, the axial distance between the two marks is compared to the axial distance between such marks on ideal pipe and collar members that have been made up to the desired torque. In this manner manufacturing tolerances and other deviations of the threads from nominal are compensated for, since each mark is placed while actually gaging the particular pipe and/or collar, being positioned relative to the actual (rather than the nominal or estimated) hand tight plane of the member.

Referring now to FIG. 1, there are shown tapered (frustoconical) threaded parts 10 and 12 (10 being the pin, 12 being the box). The two parts are illustrated in solid lines in a condition of hand tight interengagement, wherein the tapered pin is inserted into the tapered collar until the thread surfaces of the two are in firm engagement but no noticeable deformaton of either occurs. The hand tight plane of the collar is indicated by dashed line 14, and the hand tight plane of the pin 10 is indicated by the same dashed line since the two are (as above stated) coplanar in this condition. The hand tight plane of the collar is located at a distance M from the end of the collar 12, and the hand tight plane of the pipe is located at a distance $L_1$ from the end of the pipe. Values (data) of M and $L_1$ for various pipe types and sizes are stated in the American Petroleum Institute Standard 5B, identified above, but it is again emphasized that these API values of M and $L_1$ involve tolerances which applicants do not use for location of the hand tight planes.

When threaded elements of the type shown in FIG. 1 are made up into a typical joint, the pipe 10 is advanced into the collar 12 beyond the hand tight position, illustrated in solid lines, to the position illustrated in dashed lines. Such advance is through an axial distance indicated on the drawings as NP, where N is the number of turns past the hand tight plane and P is the pitch of the thread. Thus, axial advance is the mathematical product of turns (N) times pitch (P). It is emphasized that the illustrated dashed-line position is exemplary only, being for purposes of discussion.

Both pipe and collar are marked at a predetermined, fixed distance (axial) from the actual hand tight plane. Thus, with reference to FIGS. 1 and 11, a fine but readily visible marker line, extending circumferentially, is placed on the pipe and on the collar, at points 11 and 13 respectively, by apparatus to be described below. These lines are placed at known axial distances $K_1$ and $K_2$ from the true hand tight planes 14 of the pipe and collar, and therefore are at a known distance $K_1$ and $K_2$ from each other when the pipe and collar are in hand tight engagement (solid lines, FIG. 1).

Figure 11:
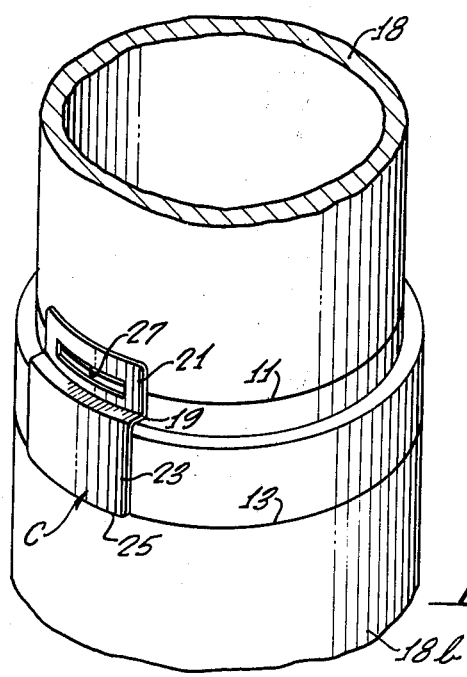
FIG. 11 is a perspective view of a joint gage applied to inspect, at the wellhead, makeup of a vertically-oriented coupled joint.

When the joint is made up to the selected (desired) torque, the marker lines move relative to each other by the distance NP, to the position shown in FIG. 11 and to the dashed-line position of FIG. 1. Thus, for a good pipe and collar, made up to the selected (desired) torque, the two marker lines are at a known distance $S = K_1 + K_2 - NP$ from each other. It is not necessary to determine any hand tight or other reference position during makeup. The pipe and collar are merely threaded upon one another in the usual manner until the selected makeup torque has been attained by the conventional tooling used for this purpose. Such tooling is caused to include a torque gage, or torque sensing means.

To inspect the made up joint it is only necessary to measure the distance S (FIG. 1) between lines 11 and 13. This measurement can be made in many ways. At present it is preferred to employ a joint gage card C which is used as illustrated in FIG. 11. The gage card is formed of a thin rigid sheet such as aluminum or plastic or the like, of a substantially rectangular configuration and having a transverse step or shoulder 19 to enable first and second gage card sections 21, 23 to lie substantially flat upon the surfaces of pipe and collar, respectively, bridging the joint and the collar end.

One end of the gage card, such as end 25, extends transversely to the length of the gage card and, in use, is placed upon the marker line 13 of the collar. The other section of the gage card has an elongated transverse window 27 formed therein. The window has a width (measured in the axial direction, parallel to the pipe and collar axes when the gage card is in use) equal to the tolerance in the empirically-determined values of NP. The distance between edge 25 and the center of window 27 is precisely fixed, for a given type of pipe, to be equal to the distance between the marker lines of a good pipe and collar when made up to the selected (desired) torque. Stated otherwise, the center of the gage card window 27 is at the correct distance S (FIG. 1) from the edge 25.

With the card edge 25 on collar marker line 13 of a made up joint, the line 11 of the pipe is visible through the window (FIG. 1) if the proper number of turns has been achieved at the selected torque. If the line 11 is not visible through the gage card window, the joint is not correct since the desired makeup position has not been attained at the selected torque. Line 11 is spaced from the end of the pipe by a distance greater than the length of pipe that is covered by the collar, to insure its visibility after makeup.

With the above-defined method, and with the apparatus described below, it is a simple task to gage each pipe and collar, place the marks thereon at the predetermined locations, and torque the collar to the predetermined torque. This procedure enables inspection of the validity of the joint simply by placing the joint gage card and viewing the marker line through the gage card window. No complex equipment is needed at the wellhead. No tools or inspection devices are necessary at the well-head, other than the conventional joint torquing equipment, the torque magnitude indicating instruments, and the gage card.

There will next be described the apparatus of the invention, following which methods will be further described.

Apparatus for Gaging and Marking the Pin and Pipe

Proceeding first to the apparatus for (1) gaging the pin, (2) locating the actual hand tight plane thereof, and (3) marking the pipe in reference to such actual hand tight plane, reference is made to FIGS. 2 through 9, inclusive. FIG. 2 shows the actual preferred orientation of the apparatus, adjacent horizontal pipe sections in a rack. FIGS. 2a through 9 are rotated ninety degrees, from the preferred operating position of FIG. 2, to aid in visualization of the various rotational movements.

Referring to FIG. 2, pipe sections 18 are shown as they are usually oriented, horizontally, in a rack. A truck "T" incorporating a boom "B" suspends the apparatus next to be described, for example by means of a spring or chain. The apparatus may either be moved to each pipe section, or vice versa. During gaging and marking, each pipe section may be moved axially in order to increase clearance relative to adjacent pipe sections.

As seen in FIGS. 2a and 3, the apparatus generally comprises a support shaft 20 rotatably carrying a ring gage assembly 22 which is adapted to be rotated by means of an air motor assembly 24 and gear box 26, all of which are carried by an L-shaped mounting bar 28. A marker standard 30 is mounted for rotation about the axis of support shaft 20. It carries a marking mechanism 32 which is keyed to the ring gage and can move both (1) circumferentially about the ring gage and the gaged pipe 18, and (2) radially inwardly and outwardly with respect to the ring gage and pipe.

Referring to FIGS. 3-7, shaft 20 carries first and second expandable packers 34, 36 which are identical to each other and axially spaced along the shaft. Each of the packers is fixed to support shaft 20, and includes a hub 38 and a circumferential resiliently expandable outer casing 40. Such casing is spaced from the hub to define therewith an air chamber 42. Casing 40 is formed of rubber or other elastomeric or plastic material.

Chamber 42 communicates with a source of air pressure (not shown) via a radial air passage 44 and an axial passage 46 that extends from an air hose 48 to the central hubs of both of the packers 34, 36.

Shaft 20, with both of the packers 34, 36 thereon, is inserted into the male threaded end of a pipe 18 that is to be gaged and marked. The casing 40 of each packer is relatively unpressurized during such insertion. Air pressure is then transmitted through the several passages to pressurize chambers 42 and expand the casings 40, thus locking shaft 20 against axial and rotational motion with respect to the pipe.

Very importantly, expansion of the packers-into pressure engagement with the interior pipe surface-achieves immediate, automatic alignment of the gage with the pipe (the axes of the gage and pipe becoming coincident when the packers are thus fluid-energized). Therefore, it becomes possible and practical to power-drive the gage onto the pipe as stated below.

A sleeve 50 is fixed to shaft 20, being secured to a support plate 52 which forms one side of a sprocket housing 54. Rotatably mounted upon sleeve 50, by means of axially spaced bearings 56, 58, is a gage drive sleeve 60. A driven sprocket 62 is fixed to sleeve 60 and engaged with a chain 64. Chain 64, in turn, is driven by a driving sprocket 66 that is fixed to the output shaft 68 of an air motor 70 (and its gear box). The air motor is provided with fittings 71, 72 for connection to a source of pressurized air (not shown). Sprocket housing support plate 52 is bolted to the mounting bar 28 which thereby carries the entire mechanism. Bar 28 is what is connected to the boom B, FIG. 2, to facilitate positioning of the apparatus with respect to a pipe or collar member to be gaged and marked.

A gage driving collar 74 is slidably mounted on driving sleeve 60 by means of circumferentially extending slide bearings 75, 76 preferably formed of "Teflon." It fixedly carries a roller 77 that rides in an axially extending slot 78 formed in an outer surface of the sleeve 60. Gage driving collar 74 is bolted to the gage assembly 22. Such assembly comprises a gage carrying cap 80 which in turn is bolted to a ring gage 82.

A circumferentially extending window 84 is provided as an aperture in the gage and gage cap to enable viewing of the extreme end of the pipe 18, for gaging purposes stated hereinafter. The ring gage 82, and the plug gage 82a described below, meet standard API specifications. They are, however, modified to incorporate the window 84 and also annular grooves or guideways (tracks) set forth subsequently.

Disregarding, at this time, the marking apparatus and its support, the operation of the gage is as follows. Assume that the gage 82 is initially at a rearward axial position with respect to the packers 34, 36, the gage being relatively close to the gear housing 54. The keying roller 77 is thus in an "upper" portion of slot 78 (as viewed in FIG. 3).

The entire apparatus is so moved that (1) the packers 34, 36, and part of shaft 20, enter the end of the pipe, and (2) a part of the gage shifts (laps) over the narrow end of the pipe (pin). Thereafter, packers 34, 36 are pressurized to create the above-stated alignment whereby the pipe axis and the axis of shaft 20 are made coincident.

Figure 7:
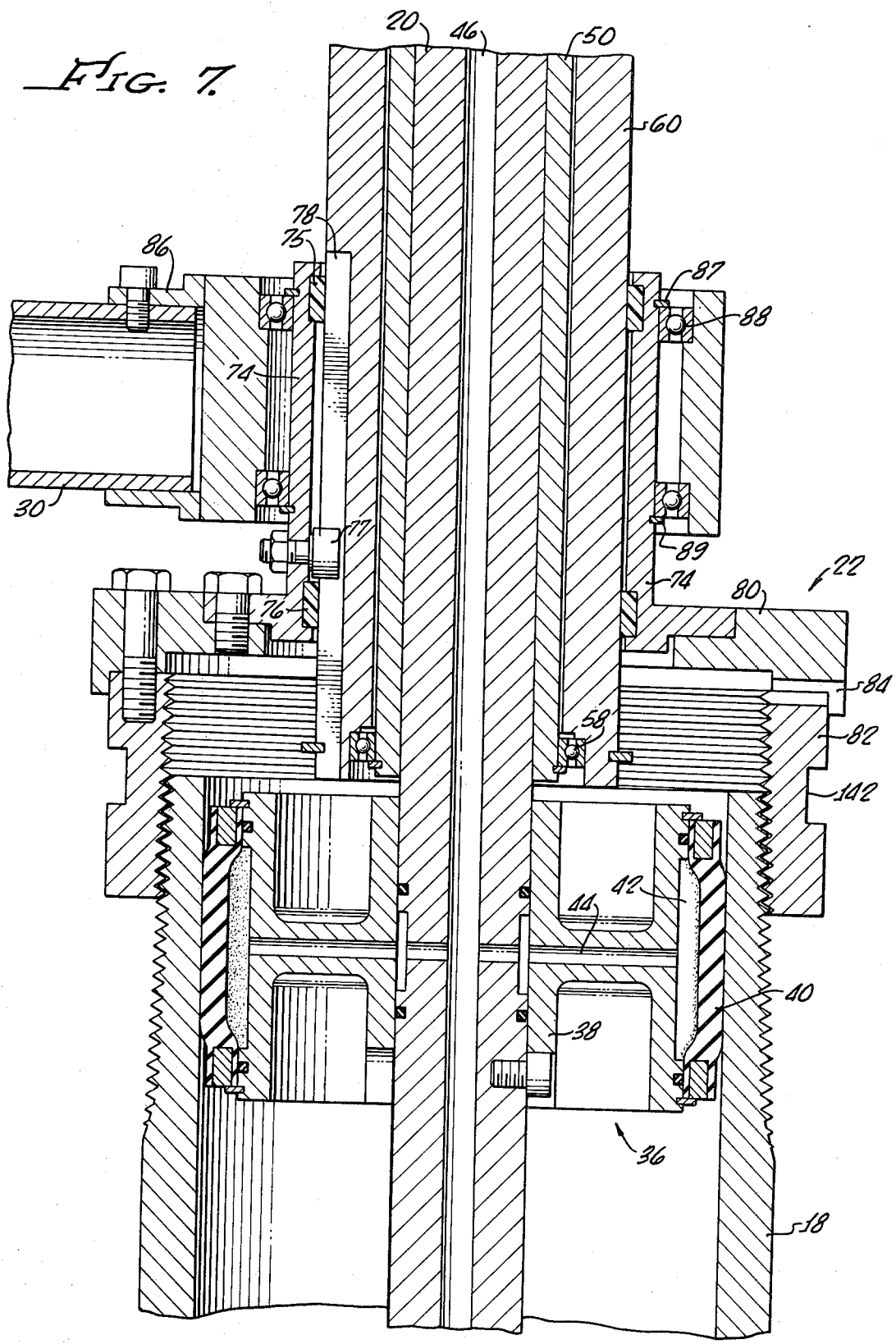
FIG. 7 is an enlarged fragmentary sectional view showing more clearly the relationships between certain parts of the apparatus.

The air motor is then started and turns the gage upon the pipe threads until the stalling torque of the air motor (and associated gearing) is reached. The air motor (and gearing) is set to have a maximum torque of between 10 and 80 foot pounds, preferably about 25 to 50 foot pounds, so that when the torque reaches the stall value no further turning of the gage upon the pipe occurs. The gage is then in the hand tight position. FIG. 3 shows the gage in the thus-achieved full forward position, in hand tight engagement with the pipe. FIG. 7 shows the gage in an intermediate position, partly threaded on the pipe, but not in hand tight engagement.

During threading of the gage upon the pipe, the gage and its driving collar 74 advance axially relative to the support shaft 20 around which they are mounted. Sleeve 60 is rotated by the motor-driven sprockets and chain 62, 64, 66, but has no axial travel. Because of the key-way or slot 78, and the keying roller 77, rotation of sleeve 60 rotates the gage collar 74. Such collar is caused to move axially of the shaft 20 as the gage is threaded upon, and advances axially along, the pipe 18.

If the pipe thread is within tolerance, the extreme end of the pipe may be viewed (in a radial direction) through the window 84 to thus complete the gaging of the pipe. Stated otherwise, if the extreme end of the pipe is visible through the window, the pipe thread is known to be good (within gage). If not, the pipe thread is not satisfactory. The axial dimension and positioning of the gage window 84, and of the plug gage window 84a described below, are in accordance with API specifications and tolerances as taught (for example) by the above-cited API Specification.

Proceeding next to a description of the pipe marking apparatus, there is rotatably mounted upon collar 74 the marker standard 30 which is inserted into and bolted to a rotatable marker standard sleeve 86. The latter is mounted upon collar 74 by means of bearings 88. Bearings 88 and sleeve 86 are retained in axial position relative to collar 74 by means of snap rings 87, 89 (FIG. 7) engaged in grooves in collar 74.

Marker standard 30 thus moves axially with the gage but is rotatable relative to the gage about the gage axis (and about the coincident axis of support shaft 20).

Standard 30 carries a marker support sleeve 90 that is axially slidable along the standard (radially with respect to the gage and pipe), but is locked against rotation with respect to the standard by means of a fixed pin 92 that rides in a slot 94 formed in standard 30. A handle 96 extends radially of the standard 30 and is fixed thereto to provide for manual control and manipulation of the marker standard and the marking apparatus.

Marker support sleeve 90 may be temporarily locked, in any position of axial adjustment with respect to standard 30, by a brake mechanism 98. The brake comprises a handle 100 pivoted to a link 102 that is, in turn, pivoted to sleeve 90 at 104. Handle 100 is also pivoted at 106 to a bell crank 108 which is itself pivoted to sleeve 90 at 110. The bell crank carries an adjustable brake shoe 112 arranged to bear against the surface of standard 30.

When the brake elements are moved to the positions illustrated in FIG. 3, sleeve 90 is locked against axial motion relative to standard 30.

When handle 100 is pivoted in a clockwise direction about its pivotal connection to link 102, bell crank 108 is pivoted about point 110 in a counterclockwise direction. This retracts the brake shoe 112 and frees sleeve 90 for sliding motion along standard 30 under control of the handle 96.

The marker mechanism itself is adjustably carried by the sleeve 90 by means of a pair of telescoping tubes 114, 116. These are axially adjustable with respect to one another, there being a lock bolt 118 (FIGS. 2a and 3) rotatably mounted in the wall of tube 114 and extending into an axially elongated slot 120 in tube 116. Lock bolt 118 is associated with suitable nut means, not shown, in such manner that when the bolt is rotated to a tightened condition the telescoped tubes 114, 116 are prevented from moving relative to each other. The described adjustment permits marker line 128 to be shifted axially relative to guide groove 142, to compensate for any variations in the locations of the guide grooves of different gage elements relative to the hand tight planes.

The marker mechanism includes a marker support plate 122 (FIGS. 4, 5, 8) which is fixed to the outer end of tube 116. Plate 122 carries a marker wheel 124 which is rotatably mounted upon a shaft 126. An ink or paint-applying narrow marker line (a peripheral flange, formed of rubber) 128 is fixed upon the periphery of the marker wheel. It is provided with ink or paint from a reservoir in the form of a sponge roller 130.

Roller 130 is carried by a shaft 132, and is held in a desired position of adjustment by a bolt 134 (FIG. 4) that is threaded edgewise into plate 122 and bears against a hub 136 for the roller. Hub 136 is rotatably mounted in plate 122, and shaft 132 is eccentric to the hub. Thus, when hub 136 is turned (after release from bolt 136) the degree of pressure of sponge roller 130 on the marker wheel is varied.

Marker roller shaft 126 has an enlarged shank 131 (FIG. 3) extending through a flanged hub 133 which rotatably mounts a guide wheel 135. Hub 133 is recessed at the side thereof facing the marker wheel 124, and receives one end of a spacer sleeve 138 which bears at its other end upon a bearing plate 139 interposed between the sleeve and the marker support plate 122. A nut 140 is threaded on the shank 131 and presses the hub 133 against the spacer sleeve 138 to axially position the guide wheel with respect to the marker wheel.

Guide wheel 135 rides in a circumferential groove, track or guideway 142 extending around the entire periphery of the ring gage 82. Such groove (and a corresponding groove in the below-described plug gage) is provided by applicants and has a fixed, certain positional relationship to the hand tight plane of the gage.

To maintain precise alignment of the marker head assembly, support plate 122 extends behind marker wheel 124 (as viewed in FIG. 3) and also toward the ring gage to form a projecting alignment section 146. Alignment section 146 (FIGS. 4, 5, 8) is provided with a slot 147 that terminates in an aperture 149. The aperture receives a shaft or pin 148 which carries an alignment arm 150. Pin 148 and arm 150 are adjustably locked by a clamping bolt 152 which extends across the slot in support plate section 146, being threaded into the support plate at the far side of the slot to provide the clamping action that retains pin 148.

Arm 150 carries a shaft 154 at the free end thereof, upon which is rotatably mounted an alignment wheel 156 which rides in the gage groove 142 (in circumferential alignment with the guide or positioning wheel 135). Alignment wheel 156 is thus adjustable with respect to the marker wheel 124, both axially and radially of the ring gage, permitting use with different sizes of pipe and different lengths of sleeves 138.

Groove 142 in the gage is, as above stated, the reference with respect to which the mark is placed upon the pipe 18 by the marker wheel 124. Thus, the axial distance between the marker wheel 124 and the guide wheel 135, which rides in the reference groove 142 of the ring gage, is precisely controlled in accordance with the predetermined distance between the hand tight plane and the marker line that is placed on the pipe. In the manufacture of the gage, the groove 142 is formed and its position precisely located relative to the hand tight plane of the gage.

The length of the spacer sleeve 138 determines the distance of the marker line from the hand tight plane. The axial distance between the guide wheel 135 and the marker line 128 is not necessarily the distance between the hand tight plane and the marker, since the ring gage groove 142 is not necessarily positioned precisely at the hand tight plane of the gage, although its location with respect to the hand tight plane is precisely known.

Mounting bar 28 has an angulated portion 160 (FIG. 2a) that pivotally carries a rocker arm (double arm) 162. Such arm is urged to a neutral position by means of a leaf spring 164 which is fixed to a collar 166 that fixedly carries arm 162. Spring 164 has its opposite ends captured between pins 168 on opposite sides of the arm 160 (FIG. 9).

Standard 30 carries at its free end a cap 170 having an arcuately grooved bracket 178 that is adapted to receive one or the other of a pair of rods 180, 182 fixed to the opposite ends of arm 162. The rods 180, 182 are sufficiently long to be engaged by the standard, regardless of the axial position of the latter. There are thus created detent or holding effects as stated below.

Collar Gaging and Marking Apparatus

Figure 10:
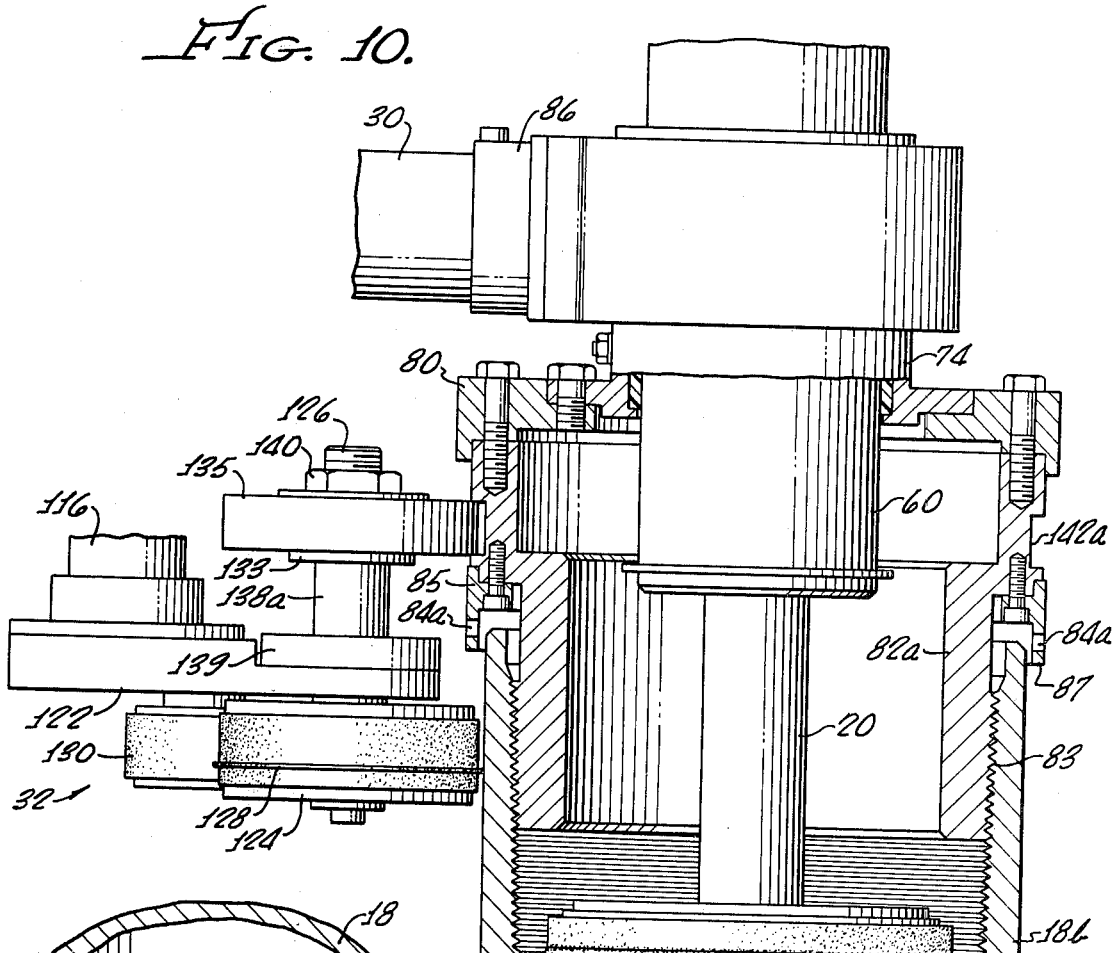
FIG. 10 is a sectional view of parts of the apparatus of FIGS. 2-9, but modified for gaging and marking a collar.

Shown in FIG. 10 is a fragmentary sectional view of the apparatus for gaging and marking the collar. This apparatus is the same as the above-described apparatus for gaging and marking the pipe sections, differing only in that a plug gage 82a is bolted to the gage-carrying cap 80 instead of the ring gage 82 of the previous figures. (It is emphasized that the packer 34, not shown in FIG. 10, is present at the end of shaft 20, and that packers 34 and 36 provide the above-described centering and aligning functions.)

The plug gage includes an externally threaded portion 83 having precision (API standard) threads adapted to engage the internal threads of collar 18b which has been previously threaded (for example, at the factory) upon one end of a pipe 18a. Fixed to the threaded portion 83 of plug gage 82a is a gage sleeve 85 having a circumferential flange 87. Such flange circumscribes portion 83 and is radially spaced therefrom to provide an annular channel for reception of the end of the collar to be gaged.

Flange 87 has a gage window 84a therein through which the extreme end of collar 18b may be viewed when the plug gage is turned into the collar and is in hand tight engagement therewith. As above stated, the window is so sized and located that, when the end of the collar may be viewed therethrough, the collar meets API standards.

All other components, and the operation, of the apparatus for gaging and marking collars are identical to corresponding components and operation of the previously-described apparatus for gaging and marking pipe sections.

Operation of Marker Means

With respect to both the ring-gage form and the plug-gage form (all of FIGS. 2a through 10), the entire marker mechanism is slidably moved along the marker standard 30 toward the gage just as soon as gage rotation ceases. To permit such movement, brake mechanism 98 (FIG. 3) is first released, being relocked when wheels 135 and 156 are in groove 142 (or 142a). Such wheels are automatically registered with the groove, because the marker means moves axially with the gage.

The marker line 128 is then in marking engagement with the exterior surface of the tubular element, at a predetermined axial distance from the hand tight plane.

By manipulating the handle 96, the standard 30 and marker wheel 124 are then caused to revolve around the pipe section 18 or collar 18b (with the marker wheel rotating about its own axis as it revolves), so that marker line 128 marks the surface of the pipe section or collar. Thus, a nearly continuous circumferential mark is placed upon the surface of the pipe (or collar) at a predetermined distance from the gage groove 142 (or 142a) and, therefore, at a predetermined distance (as determined by the length of sleeve 138 or a similar sleeve 138a shown in FIG. 10) from the hand tight plane of the gage and from the hand tight plane of the gaged pipe 18 or collar 18b.

In order to permit the above-described rotation of standard 30, in response to manipulation of handle 96, rocker arm 162 is first manually pivoted in such direction as to release bracket 178 (FIG. 2a) for movement away from the position shown in FIGS. 2a and 9. The rotation of the standard 30 (and marker) continues for somewhat less that 360 degrees, until bracket 178 contacts and receives the second latching rod 182 of arm 162. Standard 30 is then maintained in a second position.

After completion of marking, brake 98 is released. The marker head assembly is then radially withdrawn from the gage, moving axially outwardly on the standard 30. The assembly is then locked in this inoperative position by a second operation of brake 98. Air motor 70 is now started in a reverse direction to withdraw the ring gage 82 (or plug gage) from its hand tight position on the pipe. The apparatus is then ready for gaging and marking another pipe, since the reverse driving of the gage causes axial motion which brings collar 74, etc., back to the original position (with the gage relatively near sprocket housing 54).

In the next marking, the marker assembly is rotated about the pipe in the opposite direction, since it starts from the second of its two latched rotational positions. Thus, much movement is prevented—the marker standard only rotates when there is actually marking.

In another form of the apparatus, presently preferred, there is only one detent or locking means for the marker standard 30. Such standard therefore rotates the full 360 degrees for each pipe or collar section. For the next pipe or collar section, the standard rotates 360 degrees in either the same direction or the reverse direction. In no case is it necessary to rotate the standard on a dry run—when no marking is occurring.

The marking is effected for at least 180 degrees (one-half the circumference of the tubular element), and should be close to 360 degrees. This greatly facilitates the measuring step (FIG. 11) which occurs at the wellhead, there always being two line regions axially opposite each other. Furthermore, it is then unnecessary for the operator to keep walking around the pipe joint.

Further Description of Methods

Described above, with reference to apparatus descriptions, are several methods. These will not be redescribed here, but further description will now be given of the methods described above under the subhead "Preliminary Discussion, and General Description of the Method."

The present method is preferably practiced by using standard API makeup torques to form the joints at the wellhead. Such torques, for various types, sizes, etc., of casing and tubing are specified in API RP 5Cl, Tenth Edition, March, 1973, entitled *API Recommended Practice for Care and Use of Casing and Tubing*, which is hereby incorporated by reference herein as though set forth in full. It is pointed out that the referenced API material gives "maximum," "minimum" and "optimum" torques. One of such three (maximum, minimum and optimum) torques is selected and used as the predetermined makeup torque for each string of tubing or casing, in accordance with the desires of the operator.

When the API torques are used, and when the engagement is proper (correct amount of penetration of the pin into the box, in reference to the actual-not "nominal"-hand tight plane), it is known that both (a) torque and (b) engagement are correct. Thus, it is known that the joint is correctly made.

The correct numbers of turns (N) past the actual hand tight plane is (as above noted) determined empirically. Such empirical determinations are used in gaging and evaluating (with card C) the locations of marks 11 and 13 (FIGS 1 and 11), for example. The empirical determinations are the results of making up numerous joints of each type, grade, size, etc.

For example, to make the empirical determination relative to a particular type, size and grade of casing, at the "optimum" API torque, a substantial number of such joints are first made up in the oil field, using such "optimum" torque. Before thus making up each joint, each pipe and collar section is gaged and marked as set forth in detail above. It will be found that, for the great majority of the joints thus made up, the distance "S" (FIG. 1) will fall within a certain narrow range. However, for some of the thus-made joints, distance S will be outside such range (thereby indicating bad joints). The joints wherein distance S falls within the narrow range are good joints, closely approaching ideal.

To learn when the predetermined desired makeup torque is reached, for example "optimum," torquing equipment including torque-measuring means (such as a torque gage) is employed.

The gage card C (FIG. 11) is constructed so that the center of window 27 is at the middle of the above-indicated narrow range. The upper edge (FIG. 11) defining window 27 is at one end of the narrow range, while the lower edge of the window 27 is at the other end of such range.

Once the gage card C has been thus constructed, it is used to gage and evaluate a large number of other joints between pipe and collar sections of the same type, size and grade, and using the same API torque (such as "optimum"). Therefore, if the line 11 (FIG. 11) is not within the window 27 it is known that the joint is bad. Stated otherwise, the marks 11 and 13 on those made up joints having incorrect penetration are out-of-tolerance on the thus-constructed gage card C.

The marks 11 and 13 being located relative to the true hand tight planes, it will be immediately known, during running of the actual string of tubing or casing, whether or not a certain joint is "bad." This is because, as described, the predetermined torque (such as, for example, the "optimum" API torque) will then produce a penetration (engagement) not within the tolerance permitted by gage card C.

To be sure that the present gages (ring and plug) seat properly in hand tight positions, the pipe and collar threads are cleaned before gaging. This may be done by means of solvents, a wire brush, and a blast of compressed air.

As stated in the early part of this specification, the present invention has the very important advantage of being performable on standard API threads, including those having a triangular section (see FIG. 1) but termed "round." No special thread type or shape is required. The threads may, as stated, also be buttress (or square).

Further Methods

It is emphasized that use of only portions of the present overall invention produces important, beneficial results. For example, the described apparatus and method may be used only in gaging (not marking) pipes and/or collars.

As another such example, only the pipe and/or collar is marked—in reference to the true hand tight plane. Assuming, for example, that such mark is on the pipe, the mark is used (at the wellhead) to indicate—relative to a part, such as the end, of the collar—whether the penetration is as desired. The length of sleeve 138 of the marker mechanism is changed, when desired, to vary the mark positions, thus facilitating reference to the collar end. The painted-on line is preferably wide, not narrow, with the width indicating an empirically-determined tolerance. The location of the mark is also determined empirically. The marking of pipe or collar only is greatly inferior to the double-marking (both pipe and collar) method described above, but is still superior to the prior art.

In accordance with the method as stated in the preceding paragraph, the pipe and collar (or other tapered, threaded members) are threaded together at the wellhead until the predetermined desired torque (for example, the "optimum" API torque) is achieved as measured by the torque gage. It is then noted whether or not the end of the collar is in registry with the painted-on line. If it is, the joint is "good," whereas if there is no registry the joint is regarded as bad. Instead of the end of the pipe being in actual registry with the line when the joint is good, the relationships may be made such that after a predetermined makeup torque has been applied to the pipe and collar) the end of the collar is at a predetermined distance from the line when the joint is good. Such predetermined distance is achieved (and known) by altering the position of the pipe-marking means relative to the hand tight plane of the gage.

A further method, related to the one described in the preceding two paragraphs, is to thread the collar upon the pipe in the field, with suitable makeup tooling, and to monitor the makeup torque (by suitable torque gage means). Torquing of the collar upon the pipe is caused to continue until the measured torque reaches a preselected value. If (as above stated) the collar end is then in registry with the painted-on line, the joint is known to be good as set forth. However, if the collar end has then not reached the line, the torque is increased to the upper limit of a desired torque range, such upper limit being (for example) 1.25 times the optimum torque. If the collar end has still not—despite application of the increased torque—reached the painted-on line it is known that the joint is bad.

Conversely, if the collar end passes completely over the painted-on line prior to a time when the measured torque achieves a lower limit, so that no part of the line is visible, it is also known that the joint is bad. Such lower torque limit may be, for example, 0.75 times the optimum torque.

It will thus be seen that, in accordance with the two preceding paragraphs, the measured torque is monitored in accordance with (in relation to) the degree of penetration (engagement). Such degree of engagement is determined in reference to the painted-on line which, in turn, is applied by reference to the gage (the hand tight plane). Both torque and degree of engagement are monitored, torque by means of a torque gage and position by means of the gage-referenced mark. A certain range of torques, and a certain range of positions (degrees of engagement of penetration) are regarded as acceptable. Thus, so long as both the torque and the engagement are within predetermined limits (the latter being determined by the gage-referenced line) the joint is good.

Furthermore, the degree of engagement may be made substantially precise, in relation to the gage-referenced line, and the torque monitored (measured) to see whether or not it is within a desired range (such as between 0.75 times optimum, and 1.25 times optimum). This may be done, for example, by making the line on the pipe relatively narrow and then stopping torquing when the collar end registers with the line. The measured torque is then noted to see whether or not it is within the range (e.g., 0.75 optimum to 1.25 optimum).

When both the pipe and collar are gaged and marked, as is greatly preferred and as is set forth at length in major portions of this specification, the precise degree of engagement (in reference to the gage-referenced lines on both pipe and collar) is achieved by continuing torquing only until the two lines are a predetermined axial distance from each other. Such axial distance is the one selected to achieve the optimum degree of thread contact. It is then noted whether or not the torque is within the desired range, for example between 0.75 optimum and 1.25 optimum. If the torque is in the desired range, at the stated degree of engagement, it is known that the joint is good.

Miscellaneous

The speed of driving of the gage, by the motor and gear means, may be (for example) one revolution per second.

In the latest (and presently preferred) form of the apparatus, the arm 28 is replaced by a strong plate from which a stub shaft extends. Such stub shaft is prepencicular to the plate and parallel to shaft 20, being disposed in the same general location as arm portion 160. The supporting element from boom B (FIG. 2) is preferably a helical tension spring, and is connected to the stub shaft at such location that the tool, when suspended, will balance properly with shaft 20 substantially horizontal. Also, in such latest form of the apparatus, the second follower roller 156 (and its associated apparatus) is eliminated. To insure that there will be sufficient friction to cause rotation of marker wheel 124 about its own axis, a drive roller (not inked) is provided and is adapted to engage the pipe surface.

The words "mark," "marker," etc., as used in the appended claims, include not only painting or inking onto the pipe, but also other types of indicia. Thus, for example, a strip of tape—when adhesively applied to a pipe—is a "mark" in the present sense. Also, scratches, etc., are "marks." The "mark" need not be visible to the eye, so long as it may be sensed at the wellhead by appropriate apparatus. The "mark" may be magnetic, radioactive, or whatever else is desirable. It is to be understood that the mark need not be continuous but may be (for example) a dashed line.

When the coupling is previously joined with one end of a pipe section, as is frequently the case, the combination pipe section and coupling may be regarded as a single pipe section (tubular element) having a female threaded end.

The above-stated equation $S = K_1 + K_2 - NP$ was discussed on the basis of the line 13 (FIG. 1) being on the side of hand tight plane 14 remote from the unthreaded body of the pipe (that is to say, on the right side of plane 14 as viewed in FIG. 1). If line 13 were at plane 14 when the threads are in the hand tight condition, $K_2$ would be zero. If line 13 were then on the left side of plane 14 (FIG. 1), $K_2$ would be a negative number.

One of the numerous advantages of the present invention is that pipe and collar sections may be made economically (for example, without external or internal shoulders, or special threads or seals) yet good, strong sealed joints will result.

The foregoing detailed description is to be clearly understood as given by way of illustration and example only, the spirit and scope of this invention being limited solely by the appended claims.

We claim:

1. Apparatus for gaging a threaded pipe or collar element, comprising:
   (a) a support having an axis and adapted to be detachably secured to said threaded element,
   (b) a threaded gage mounted to said support for rotational and axial motion about and along said axis, and
   (c) marking means for marking said threaded element at a predetermined position relative to said gage.

2. The invention as claimed in claim 1, in which said support comprises packer means adapted to be fluid expanded into tight engagement with the interior of said threaded element, and when thus expanded to cause the axis of said gage to be coincident with the axis of said threaded element, said gage being selected from a class consisting of ring gages and plug gages.

3. The apparatus of claim 1, wherein said marking means comprises a marker assembly and means for mounting said marker assembly for at least partial revolution about the axis of said threaded element in a position axially fixed with respect to said gage.

4. The apparatus of claim 1, including means for mounting said marking means to said gage for motion toward and away from the axis of said support.

5. The apparatus of claim 4, including cooperating means on said gage and marking means for locating said marking means axially of said gage.

6. The apparatus of claim 1, including power means for rotating said gage and adapted to stop rotation when said gage reaches the hand tight plane.

7. Apparatus for gaging a frustoconical pipe or collar element, comprising:
   (a) an elongated support adapted to be detachably fixed to said element,
   (b) a thread gage selected from a class consisting of ring gages and plug gages,
   (c) means for mounting said gage to said support for rotational and translational motion about and along said support, and
   (d) power means for rotating said gage with a torque which is (1) sufficiently large to turn the gage into hand tight engagement with said threaded element, and is (2) not greater than that required to turn the gage past hand tight engagement.

8. The apparatus of claim 7, including a marker assembly, and means for mounting said marker assembly to said gage for at least partial revolution about the gage axis while in an axially fixed position with respect to the gage.

9. The apparatus of claim 8, wherein said gage is provided with a circumferential guideway and wherein said marker assembly includes a guide follower positioned to travel in said guideway as said marker assembly revolves about said gage.

10. The apparatus of claim 7, including a marker assembly mounted in an axially fixed position relative to said gage.

11. The apparatus of claim 7, in which means are provided to mount said support coaxially within a threaded element, said means comprising fluid-expansible packer means.

12. A gage assembly, comprising:
   (a) a support shaft,
   (b) means carried on said support shaft for detachably gripping a threaded element to be gaged, (c) a drive sleeve rotatably mounted upon said support shaft,
(d) a gage collar slidably mounted upon said sleeve and coupled to said sleeve for rotation therewith,
(e) a gage connected to said gage collar and having a circumferential guideway,
(f) a marker standard rotatably mounted upon said gage collar,
(g) a marker support mounted upon said marker standard for motion toward and away from said gage,
(h) a marker head assembly carried by said marker support, and
(i) a guide follower connected with said marker support and marker head assembly for guiding engagement with said gage guideway when said marker support is radially positioned close to said gage.

13. Apparatus for gaging a threaded member, comprising:
(a) a thread gage having an axis and adapted to be threadedly engaged with said threaded member,
(b) marker means for marking said threaded member, and
(c) means for positioning said marker means at a predetermined location relative to said gage axis and in proximity to a threaded member engaged with said thread gage.

14. The apparatus of claim 13, including means for connecting said marker means to said thread gage for movement toward and away from a threaded member engaged with said thread gage.

15. The apparatus of claim 14, wherein said means for connecting said marker means includes a marker support and means for mounting said marker support to said thread gage for rotation about said gage axis.

16. Apparatus for gaging the tapered, threaded ends of threaded tubular elements such as pipe and collar members, said apparatus comprising:
(a) support means adapted to be mounted on a threaded tubular element, whereby said support means is itself supported by said element,
(b) means associated with said element to cause at least a part of said support means to have an axis which is coincident with that of said element, and
(c) thread gage means mounted on said support means for rotation about said axis when it is thus coincident with that of said element,
said thread gage means and said support means being adapted to permit axial and rotational movement of said thread gage means into predetermined engagement with the threads of said threaded element.

17. The invention as claimed in claim 16, in which at least part of said means (b) is adapted to be disposed in the interior of said element in contact with an interior surface portion thereof.

18. The invention as claimed in claim 17, in which said means (b) comprises fluid-expanded centering means adapted when expanded to cause said axes to be concident, said centering means being adapted when not expanded to permit insertion of said support means into, and withdrawal from, the interior of said element.

19. The invention as claimed in claim 16, in which power means are provided to rotationally drive said gage means to, and only to, said predetermined engagement with the threads of said threaded element, said power means and said means (b) cooperating with each other to create initial threading of said gage means on said element without cross-threading.

20. The invention as claimed in claim 16, in which said thread gage means has a window therein disposed to permit viewing of the extreme end of said element along a sight path radial to said element, said window being sized and disposed to inform the operator, when said gage means is in said predetermined engagement with the threads of said element, whether or not said threads conform to standard.

21. The invention as claimed in claim 16, in which additional support means independent of said threaded element are provided to support said means (a), (b) and (c) at a position adjacent the end of a threaded element when the latter is horizontally oriented, said additional support means being adapted to facilitate the association of said first-mentioned support means with said threaded element.

22. Marking apparatus for use relative to the threads of a tubular member, such as in a tapered threaded pin or box region of a pipe section or collar, said apparatus comprising:
(a) a thread gage adapted for rotational and axial movement relative to the threads of a tubular member,
said gage being selected from a class consisting of ring gages and plug gages,
(b) marker means at least a portion of which is adapted to place an elongated mark on the exterior of a tubular member,
the direction of said elongated mark being generally circumferential to said tubular member, and
(c) means to associate said thread gage with said marker means in such manner that, when said gage is in a predetermined relationship to said tubular member, the distance axially of said tubular member from said gage to said mark is predetermined and known.

23. The invention as claimed in claim 22, in which support and alignment means are provided to effect mounting of said gage adjacent the threaded end of said tubular member, and in coaxial relationship to said tubular member whereby to facilitate greatly the initial threading of said gage at said threaded end.

24. The invention as claimed in claim 22, in which said marker means moves about the axis of said tubular member and provides a mark around at least one-half the circumference thereof.

25. The invention as claimed in claim 22, in which said means (c) permits rotation of said gage independently of said marker means, and further permits said marker means to rotate independently of gage rotation but at said predetermined axial distance from said gage.

26. The invention as claimed in claim 22, in which said means (c) comprises track or guide means on said gage and extending circumferentially hereof, and further comprises track-follower means connected to said marker means for maintenance of said predetermined axial distance while said track-follower means moves along said track.

27. The invention as claimed in claim 26, in which means are provided to disengage said track-follower means from said track, whereby said gage may be free of said track-follower means while being threaded onto said threaded end.

28. Apparatus for use with threaded tubular elements, such as pipe and collar elements, said apparatus comprising:

(a) support means adapted to be located adjacent the ends of tubular elements while the latter are disposed horizontally in an oil field, and
(b) means carried by said support means to effect gaging of said tubular elements,
said gaging means including a gage selected from a class consisting of ring gages and plug gages,
said gaging means further including power means to effect relative rotation, about a generally horizontal axis, of said gage and each tubular element but only until said gage is in predetermined engagement with the threads of said tubular element.

29. The invention as claimed in claim 28, in which means are associated with said gaging means to mark each tubular element at a location determined by said gage when said gage is in said predetermined engagement.

30. The invention as claimed in claimed 29, in which said predetermined engagement is hand tight, and in which said apparatus further comprises indicator means to be used while said tubular elements are vertically oriented at the wellhead, after each joint has been made between said elements at a predetermined makeup torque, said indicator means being constructed in accordance with factors including the distance, axially of the tubular element, between a thus-made mark and the hand tight plane of the thus-gaged tubular element.

31. Apparatus for use in the correct making of threaded joints between threaded tubular elements, such as pipe and collar elements, in an oil field, said apparatus comprising:
(a) means to gage the threads of said tubular elements to locate the actual, as distinguished from theoretical, hand tight planes of said threads,
(b) means to mark the exteriors of said tubular elements at axial positions determined by the locations of said hand tight planes, and
(c) means, related to the distance between said hand tight planes and said marks, to indicate at the wellhead, after each joint has been made up to a predetermined makeup torque, whether or not such joint has the proper degree of penetration of the pin into the box.

32. Apparatus for use relative to threaded tubular elements such as pipe sections and collars, said apparatus comprising:
(a) support means mounted on the threaded end portion of a tubular element,
at least a part of said support means extending outwardly past said threaded end portion coaxially thereof, and
(b) gage means mounted on said support means part coaxially thereof, p2 said gage means comprising a gage selected from a class consisting of ring gages and plug gages,
said gage being adapted to rotate and to shift axially whereby said gage may thread onto said tubular element to a predetermined position.

33. The invention as claimed in claim 32, in which said gage means further comprises a collar connected to said gage and a sleeve mounted rotatably on said support means part coaxially thereof, said collar being mounted coaxially around said sleeve and being adapted to shift axially relative thereto, in which means are provided to cause rotation of said collar with said sleeve while permitting said axial shifting of said collar, and in which power means are provided to rotate said sleeve and thereby rotate said collar and said gage, said gage thus being power-threaded onto said tubular element.

34. The invention as claimed in claim 32, in which fluid-operated packers are incorporated in said support means to look the same in position relative to the tubular element, and to cause said support means part to be coaxial to the tubular element when said packers are fluid-expanded.

35. The invention as claimed in claim 34, in which said packers are adapted to be disposed within the tubular element and, when expanded, to contact the interior surface thereof.

36. The invention as claimed in claim 32, in which said gage has means therein shaped and located to indicate the correct location of the extreme end of the tubular element when the threads of said tubular element are within gage.

37. The invention as claimed in claim 32, in which marker means are mounted rotatably on said gage means for rotation about the axis of said tubular element, said marker means being adapted, when said gage is in said predetermined position on the threads of said tubular element, to place a mark at a predetermined location on such element.

38. The invention as claimed in claim 32, in which said gage means further comprises a collar connected to said gage and a sleeve mounted rotatably on said support means part coaxially thereof, said collar being mounted coaxially around said sleeve and being adapted to shift axially relative thereto, in which means are provided to cause rotation of said collar with said sleeve while permitting said axial shifting of said collar, in which power means are provided to rotate said sleeve and thereby rotate said collar and said gage, said gage thus being power-threaded onto said tubular element, and in which marker means are mounted rotatably on said collar but are constructed to move axially with said collar, said marker means being adapted, when said gage is in said predetermined position on the threads of said tubular element, to place a mark at a predetermined location on the exterior surface of such element.

39. The invention as claimed in claim 38, in which said marker means comprises a standard which extends outwardly from said collar and is rotatable relative thereto, and further comprises a marking assembly mounted on said standard for movement toward and away from said tubular element, said marking assembly having a guide portion which is engaged with said gage for guiding thereby when said marking assembly is adjacent said tubular element, said marking assembly also having a marker portion which engages and marks said tubular element when (1) said marking assembly is adjacent said tubular element and (2) there is rotation of said standard about said tubular element.

40. The invention as claimed in claim 39, in which said guide portion is adapted, when not engaged with said gage, to be adjusted axially relative to said gage in order to be in precise registry with a track region of said gage.

41. The invention as claimed in claim 39, in which means are provided to releasably maintain said standard at at least one rotated position thereof, whereby said standard may be rotated in one direction to mark one tubular element, and in the opposite direction to mark a second tubular element.

42. The invention as claimed in claim 39, in which said guide portion includes at least one follower element extended into an annular guide groove in said gage.

43. The invention as claimed in claim 39, in which support means are provided for suspending the entire apparatus adjacent racked tubular elements.

44. The invention as claimed in claim 32, in which marker means are mounted rotatably on said gage means for rotation about the axis of said tubular element, said marker means being adapted, when said gage is in said predetermined position on the threads of said tubular element, to place a mark at a predetermined location on the exterior surface of such element, and in which a distance gage element is provided for positioning adjacent a made up pipe joint at the wellhead, part of said distance gage element being adapted to be oriented in relation to said mark on the tubular element, said distance gage element being sized in relation to the location of said mark on a good threaded joint made up to a predetermined torque.

45. A method of gaging a tapered thread of a tubular element,
such as a pipe section or collar, said method comprising:
(a) causing a support member to be supported by the tubular element to be gaged, in such relationship that the support member has an axis coincident with that of the tubular element,
(b) supporting a thread gage, selected from a class consisting of ring gages and plug gages, on the support member coaxially of the tubular element, and
(c) threading the thread gage relative to the tubular element until a predetermined threaded relationship is achieved,
said threading being effected by causing relative rotation between said thread gage and said tubular element.

46. A method of gaging well pipe sections, such as casing and tubing sections and collars, in an oil field, said method comprising:
(a) providing a gage, selected from a class consisting of ring gages and plug gages, on a support means, in such manner that said gage may move axially relative to said support means,
(b) bringing said gage and said support means into proximity with the tapered threaded end of a pipe section in such manner that (1) the thread of said gage is partially lapped relative to the thread of such end, and (2) said support means is partially inserted into the end of said pipe section,
(c) shifting said support means until the axis of said gage is coincident with that of said pipe section, and
(d) driving said gage into predetermined engagement with said pipe section.

47. The invention as claimed in claim 46, in which said step (c) is effected by pressurizing packer elements interposed between said support means and the interior wall at said pipe section.

48. The invention as claimed in claim 46, in which said step (c) is performed after said step (b).

49. The invention as claimed in claim 46, in which said method further comprises bringing a marker assembly into engagement with said pipe for guiding thereby, and causing said marker assembly to mark the pipe at a predetermined axial distance from a reference on said gage.

50. The invention as claimed in claim 49, in which said method further comprises shifting said marker assembly circumferentially of the pipe to thus effect said marking.

51. The invention as claimed in claim 49, in which said method further comprises screwing together two thus-marked pipe sections to a predetermined makeup torque, while said sections are vertically oriented over a well hole, and then determining the axial distance between the marks.

52. The invention as claimed in claim 51, in which said method further comprises comparing such axial distance to the axial distance which would be present for good pipe sections of the same type, size and grade.

* * * * *